(12) United States Patent
Ohl (10) Patent No.: US 10,882,517 B2
(45) Date of Patent: Jan. 5, 2021

(54) METHOD AND APPARATUS FOR DETERMINING IMPASSABLE REGIONS

(71) Applicant: Elektrobit Automotive GmbH, Erlangen (DE)

(72) Inventor: Sebastian Ohl, Braunschweig (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 317 days.

(21) Appl. No.: 16/008,912

(22) Filed: Jun. 14, 2018

(65) Prior Publication Data

US 2018/0362030 A1     Dec. 20, 2018

(30) Foreign Application Priority Data

Jun. 14, 2017   (DE) .................... 10 2017 210 081

(51) Int. Cl.
   *G06F 17/10*     (2006.01)
   *G06G 7/78*      (2006.01)
   (Continued)

(52) U.S. Cl.
   CPC ........ *B60W 30/09* (2013.01); *B60W 30/0956* (2013.01); *G05D 1/0214* (2013.01);
   (Continued)

(58) Field of Classification Search
   CPC ............. B60W 30/09; B60W 30/0956; G05D 1/0214; G05D 1/0274; G08G 1/165; G08G 1/66; G06F 19/00; B60K 35/00
   (Continued)

(56) References Cited

U.S. PATENT DOCUMENTS 5,461,357 A   10/1995   Yoshioka et al.
8,589,060 B2  11/2013   Becker
              (Continued)

FOREIGN PATENT DOCUMENTS

CN   102196602        9/2001
DE   43 02 527 A1     8/1993
              (Continued)

OTHER PUBLICATIONS

Rolf Johansson, "The Need for and Environment Perception Block to Address all ASIL Levels Simultaneously", 2016 IEE intelligent Vehicles Symposium (IV) Gothenburg, Sweden, Jun. 19-22, 2016.

*Primary Examiner* — Mahmoud S Ismail
(74) *Attorney, Agent, or Firm* — Cozen O'Connor (57) ABSTRACT

A method for determining, dependent on safety levels, spatial regions that are impassable by a vehicle includes: capturing sensor signals and evaluating the captured signals with respect to the spatial position of an obstacle and the effect of the obstacle on the passability of the area surrounding the obstacle; and providing at least two grid structures assigned to different safety levels, each having spatial regions of substantially constant size. The size of the spatial regions is dependent on the safety level of the respective grid structure. The obstacles are entered in the spatial regions of the at least two grid structures. A safety level matching the current state of the vehicle is selected. A grid structure belonging to the selected safety level is selected. All spatial regions of the selected grid structure having an entry exceeding a minimum value are marked as regions impassable by the vehicle.

5 Claims, 5 Drawing Sheets

(51) Int. Cl.
*G08G 1/16* (2006.01)
*B60W 30/09* (2012.01)
*B60W 30/095* (2012.01)
*G05D 1/02* (2020.01)

(52) U.S. Cl.
CPC .......... *G05D 1/0274* (2013.01); *G08G 1/165* (2013.01); *G08G 1/166* (2013.01); *G05D 2201/0213* (2013.01)

(58) Field of Classification Search
USPC ........................................................ 701/301
See application file for complete search history.

(56) References Cited

U.S. PATENT DOCUMENTS

| | | | |
|---|---|---|---|
| 9,308,915 B2 | 4/2016 | Huth et al. | |
| 2007/0005306 A1 | 1/2007 | Foessel | |
| 2010/0114490 A1* | 5/2010 | Becker | G01S 13/931 |
| | | | 701/301 |
| 2017/0106750 A1* | 4/2017 | Tauchi | B60R 1/00 |

FOREIGN PATENT DOCUMENTS

| | | |
|---|---|---|
| DE | 10 2006 047 131 A1 | 4/2008 |
| DE | 20 2013 006 676 U1 | 10/2014 |

* cited by examiner

METHOD AND APPARATUS FOR DETERMINING IMPASSABLE REGIONS

BACKGROUND OF THE INVENTION

1. Field of the Invention

The present invention relates to a method and an apparatus for determining regions in the environment of a vehicle which are impassable by the vehicle.

2. Description of the Related Art

U.S. Pat. No. 7,266,477 B2 describes the practice of determining spatial regions around a vehicle in which obstacles are situated. In addition to a stationary grid structure, a further grid structure is shown, which further grid structure is oriented to the vehicle and covers only a limited region in front of and laterally in front of the vehicle. Regions with obstacles are marked in this grid structure. These regions are impassable by the vehicle. This further grid structure is updated at regular intervals.

The disadvantage can be considered to be the fact that the individual regions can be evaluated differently depending on their distance to the vehicle, which corresponds to different safety levels. Different algorithms and time-consuming computing operations are required.

CN 102196602 B shows a dynamic grid structure belonging to a vehicle for a self-organizing network of a plurality of vehicles. The grid structure has tight meshes in the vicinity of the vehicle and wider meshes, the further away from the vehicle the meshes are situated. The different mesh widths inside a grid structure require complicated computing operations during the transition from tight meshes to wide meshes and vice versa. This can be considered to be disadvantageous.

Thus, an improved method for determining regions in the environment of a vehicle impassable by the vehicle is desired, wherein this method should manage with computing operations as simple as possible

SUMMARY OF THE INVENTION

In view of the problems of the prior art, the present application provides a method having and a corresponding computer program product, a storage medium, an apparatus and a vehicle.

The method according to one aspect of the invention is generally computer-implemented and is used to determine spatial regions impassable by a vehicle, wherein the determination is carried out on the basis of safety levels. The method can also be implemented in hardwares for example in a special integrated circuit. In this case, the vehicle is a land vehicle such as an automobile, a motorcycle or a train, a watercraft such as a ship or a submarine, or an aircraft such as an airplane, a helicopter, a drone or an airship. In the broadest sense, the method according to the invention can also be applied to the movement of a person irrespective of whether or not the person is in a vehicle. The spatial regions are usually two-dimensional regions of the ground surrounding the vehicle, for example adjacent squares. Three-dimensional regions of the ground surrounding the vehicle, from the soil to a particular height, for example to twice the vehicle height, for example adjacent cubes, can also be usefully provided here. An extent of the three-dimensional regions under the ground can also be usefully provided, for example in the case of watercraft below the surface of the water or in the case of land vehicles in sandy soil or soil which is otherwise soft or can be easily penetrated, in particular in the case of working equipment with excavator shovels, plowshares or similar elements which can also penetrate the ground during operation. A less confined restriction in the third dimension is appropriate in aircraft, submarines or other vehicles which have a corresponding radius of action in all three spatial dimensions. The safety levels are adapted to the risk of an accident in the current driving situation. A higher safety level is selected if the vehicle is moving quickly, and a lower safety level suffices if the vehicle is moving slowly or is at a standstill. Other factors may also influence the safety level, for example the fact of whether or not the vehicle is loaded with hazardous material, whether passengers or freight particularly worthy of protection is/are on board, whether the weather conditions necessitate a higher safety level or similar factors. Regions that are impassable by the vehicle are considered to be regions in which entry is not desired or is not allowed for safety reasons or other reasons.

In one aspect, the invention provides for sensor signals to be captured, in this case, the signals may come from radar sensors, sonar sensors, infrared sensors, other optical sensors or other suitable sensors. In this case, the sensors may be both restricted to narrow angular ranges and cover a large angular range. The sensor signals are evaluated with respect to the spatial position of the obstacles detected by them and with regard to whether the corresponding obstacles are such that they influence the passability by the vehicle. The spatial position of the obstacle indicates where the obstacle is situated with respect to the vehicle. Possible obstacles are other vehicles, buildings or the like, fog, wetness or slipperiness, unstable or highly uneven ground, a strong current or side wind, persons such as children at play, for example, or other conditions which can be considered to be an obstacle. On account of the obstacle, the corresponding region is classified as impassable. Furthermore, at least two grid structures are provided and are each assigned to different safety levels. In this case, each of the grid structures has spatial regions of a constant size, wherein the size of the regions is dependent on the safety level of the respective grid structure. In this case, the grid structure is divided in a checkered manner, for example, but a honeycombed division or another suitable division may also be advantageously used here. A grid structure usually has grid elements of the same size, for example squares of a constant side length, rectangles or rhombuses with a constant surface area and constant side ratios, corresponding honeycombs or the like. The higher the safety level, the larger the spatial regions of the grid structure, and, the lower the safety level, the smaller the spatial regions.

The evaluated sensor signals are entered in the spatial regions of the at least two grid structures. In the simplest ease, the result of the evaluation is the statement of whether or not there is an obstacle. For this purpose, a "0" or a "1" is entered for the respective region. It is likewise within the scope of the invention to assess the detected obstacle, for example according to the type, size, speed or the like, and to enter a weighted value. If a plurality of obstacles are situated in a spatial region of the grid structure, one preferred variant provides for the values which are to be entered to be added, in this case. If an upper limit is exceeded, provision may be made for a value which is higher than this upper limit not to be entered. However, it is likewise possible not to provide an upper limit here. Furthermore, a safety level matching the current state of the vehicle is selected. For example, a high safety level is selected for a high speed of the vehicle, and a lower level is selected for a lower speed. The safety level is preferably also dependent on the design of the vehicle, its load (heavy or light load, dangerous or safe load or the like), its occupation (many persons or few persons, persons in need of protection), or the like. The grid structure belonging to the selected safety level is then selected and the regions which are impassable by the vehicle are then marked in the grid structure. Regions having an entry which exceeds a minimum value are marked. Regions which are adjacent to such a region are also accordingly marked in accordance with one variant. In the case of entries which assume either the value "0" or the value "1", the minimum value is "0". A suitable minimum value is selected in the case of continuous entries. One advantage of the solution according to the invention is that all spatial regions for each of the different grid structures are marked according to the same algorithm and only the size of the respectively considered regions differs. This saves the effort and computing time required for different algorithms. For example, all regions which adjoin a first region via an edge or a corner are considered to be adjacent regions. As a result of the size of the regions differing depending on the safely level, a respectively larger region is therefore marked as impassable for higher safety levels, whereas smaller regions are marked as impassable during a slow journey, that is to say for a low safety level. Different algorithms are not required for different safety levels, which would be the case with a single grid and therefore a definition of adjacent regions which differs depending on the safety level Not only the directly adjacent regions but also second-next or third-next adjacent regions would have to be marked as impassable for a higher safety level, for example.

The invention provides for the evaluated sensor signals to be entered in the spatial regions by a weighting. In this case, the weighting can be carried out using a weighting factor, using a weighting function or in another suitable manner. In this case, the weighting function is dependent on the distance between the center point of the obstacle and the center point of the respective region, and/or it is dependent on the spatial extent of the obstacle. The weighting function is preferably a Gaussian function centered around the center point of the obstacle. In the case of a two-dimensional grid structure. It is a two-dimensional Gaussian function and, in the case of other dimensions of the grid structure, it is a weighting function of a corresponding dimension. Another weighting function can also be usefully used here, for example a function adapted to the vehicle conditions, a function adapted to the type of surrounding area (city, rural road, highway, open country) or a function that can be implemented in an uncomplicated manner but is nevertheless sufficiently close to reality.

The weighting is preferably carried out on the basis of the speed at which a detected obstacle is moving. This has the following advantage: if an obstacle is the reason for a region being impassable by the vehicle, this obstacle is given a higher weighting if it is in motion than if it is a stationary obstacle. In the simplest case, the weighting is carried out in a linear manner with the speed, but a quadratic or exponential relationship also constitutes an advantageous solution under certain conditions. Other relationships, a graduated dependence or the like are also within the scope of the invention. A moving obstacle cannot be as easily evaded as a stationary obstacle. This is taken into account by the higher weighting. If the obstacle is moving monotonously in a particular direction, the weighting is advantageously carried out on the basis of the direction. In this manner, adjacent regions that will be entered by the obstacle in the near future are already predictively marked with a higher value, whereas regions that will soon be far away from the obstacle moving away from them are already marked with a lower value early on and are therefore already indicated as passable again early on.

The invention provides for a route that avoids the marked impassable regions to be determined, and for the vehicle to be controlled according to the route determined in this manner. The route is such that the obstacle is bypassed, for example by avoiding impassable regions. The avoidance of the obstacle also advantageously includes a reduction in the speed. A reduction in the speed therefore results in a lower safety level being reached, at which a shorter distance to the obstacle is acceptable. A shorter distance then suffices for bypassing the obstacle. The control operation also includes the braking of the vehicle, if necessary to a standstill, in order to avoid a collision if a bypass possibility cannot be determined even at a lower safety level. Alternatively, the driver is notified so that he assumes control of the vehicle.

The computer program product is preferably a computer program, software or executable code stored on a non-transient computer readable medium, and which can be loaded onto a computer or another computing device of the vehicle in a wired or wireless manner as a data stream and is suitable for carrying out the method in the method claims.

An apparatus according to the invention for determining spatial regions which are impassable by a vehicle in a manner dependent on safety levels has at least one sensor for detecting obstacles in the environment of the vehicle, an evaluator for evaluating the detected obstacles according to a method according to the invention, and a controller for controlling the vehicle while avoiding the impassable regions.

BRIEF DESCRIPTION OF THE DRAWINGS

Further configurations of the invention and their advantages are also stated in the following description on the basis of exemplary embodiments. In this case, identical elements are provided with identical reference symbols and are not described again if their form, method of operation or the like does not differ from that previously described. In the drawings.

DETAILED DESCRIPTION OF THE PRESENTLY PREFERRED EMBODIMENTS

Figure 1:
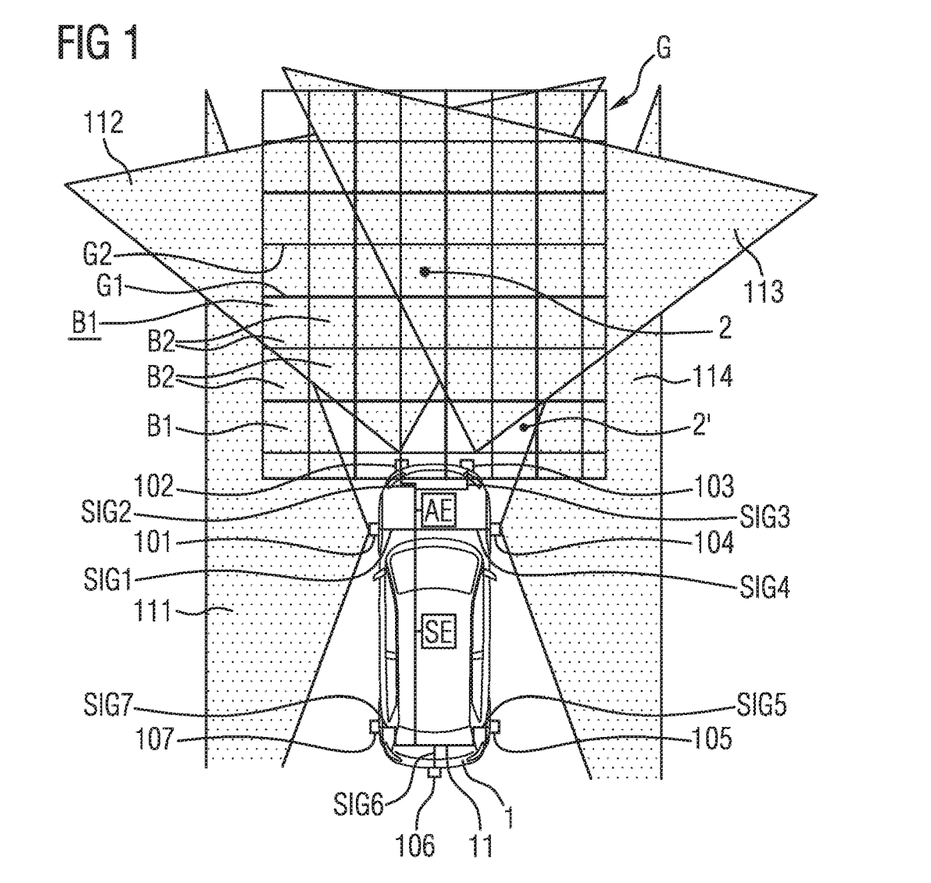
FIG. 1 shows a vehicle having an apparatus for carrying out the method according to the invention

FIG. 1 shows a vehicle having an apparatus for carrying out the method according to the invention. A vehicle 1 which is equipped with sensors 101-107 for detecting obstacles 2 in the environment of the vehicle 1 is seen. The vehicle 1 also has an evaluator (evaluation unit) AE that receives and evaluates sensor signals SIG1-SIG7. For this purpose, the sensors 101-107 are connected to the evaluation unit AE via a bus 11 feat operates according to the CAN bus standard, for example. A controller SE is also connected to the bus 11.

The sensors 101-107, the bus 11, the evaluation unit AE and the controller SE are illustrated only schematically here.

A grid structure G having spatial regions B1, B2 can be seen in front of the vehicle 1. In this case, very large spatial regions B1 are delimited using bold lines, whereas large spatial regions B2 constitute only a quarter of the size of the very large spatial regions B1 and are delimited using lines of a normal thickness. It is seen that the spatial regions B1, B2 at the right-hand and lower edges of the grid structure G are smaller at the edge than most of the other corresponding regions B1, B2. This is a side effect of the selected spatial division. It can be avoided if a uniform distribution of complete spatial regions B1, B2 is carried out as symmetrically as possible with respect to the longitudinal axis of the vehicle 1. Here, it may be the case that the grid structure G1 belonging to the very large spatial regions B1 does not match the grid structure G2 belonging to the large spatial regions B2 at the edge. The size of the spatial regions B1 is constant, except for the size of those regions B1 at the right-hand or lower edge. They are nevertheless treated like the majority of other regions B1, which, as has emerged, does not have any unreasonable influence on the result of the method. A corresponding situation applies to the large spatial regions B2. As stated, both can be optimized such that the spatial regions B1 and B2 are not only of substantially the same size, but rather are all of the same size.

The regions 111-114 captured by the sensors 101-104 are illustrated using dots. It is seen that these regions overlap in a large part of the area surrounding the vehicle 1 and that only a few regions are not captured. These axe either very close to the vehicle or are still very far away from it and are therefore not in the grid structure G, G1, G2 or are only at the outermost edge of the grid structure G, G1, G2. No regions captured by the sensors 105-107 arranged in the rear region of the vehicle 1 are depicted in order to avoid making the figure too unclear. The size of the regions that are not captured is reduced again with these sensors 105-107. The regions that directly adjoin the vehicle 1, do not overlap and are therefore not monitored fey any of the sensors 101-107 shown are all such that an obstacle 2' that is possibly in these regions must first of all have passed through one of the regions 113, 114 before it reaches this region that is not covered. If the obstacle 25 or the vehicle 1 is moving, the obstacle 2; cannot reach the illustrated blind spots captured by none of the sensors 101-107 without having previously passed through a captured region 111-114. The obstacle 2' is not captured only in the situation in which the vehicle 1 was initially inactive, then the object 25 reached the position illustrated and then the vehicle 1 and the sensors 101-107 were activated. This is usually the case after restarting the vehicle 1. In such a case, however, the driver still usually retains control anyway. If these regions are also intended to be captured, it is appropriate to either increase the angular range captured by the sensors 101-104 or to arrange additional sensors, which are not illustrated here, between the sensors 101 and 102, 102 and 103 and 103 and 104.

The controller receives information relating to a route determined by the evaluation unit AE via the bus 11 and converts this information into control signals for various components of the vehicle 1 in order to control the latter according to the determined route.

Figure 2:
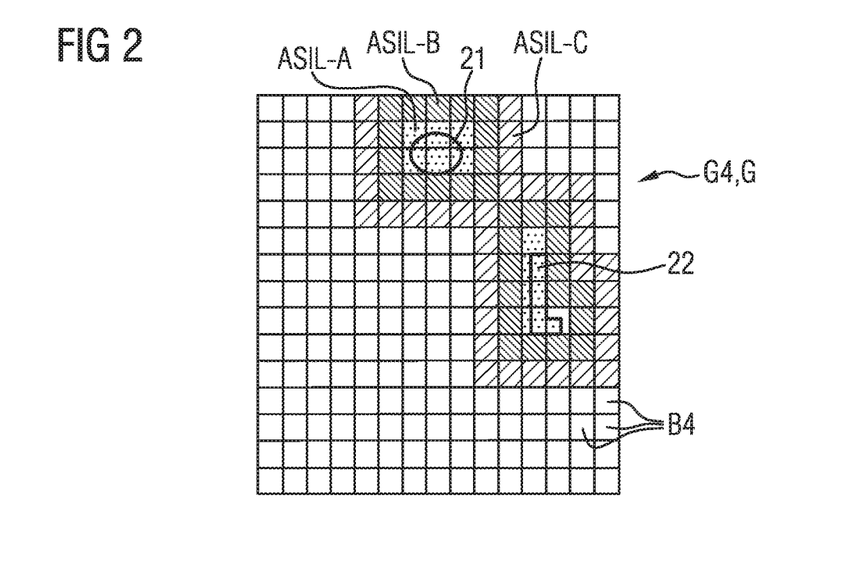
FIG. 2 shows a grid structure having obstacles.

FIG. 2 shows a grid structure G4 in which obstacles 21, 22 are situated. The obstacle 22 has an oval shape and the obstacle 22 is L-shaped. The grid structure G4 has spatial regions B4 of a small size. Dotted regions B4 are seen around the obstacles 21, 22 and correspond to the lowest safety level ASIL-A. Regions B4 which are a dark color and correspond to a medium safety level ASIL-B, are situated around the dotted regions. Marked regions B4, which correspond to a high safety level ASIL-C, are arranged adjacent to the dark regions. In this case, it should be noted that the regions of a medium safety level ASIL-B also contain those of the low safety level ASIL-A, and those of the high safety level ASIL-C also contain those of the low safety level ASIL-A and of the medium safety level ASIL-B. Different groups of regions B4 therefore need to be treated differently depending on the safety level, which signifies an increased complexity of the algorithms used. Therefore, the invention provides for a plurality of grid structures G1-G4 to be used instead of a single grid structure G, G4, the plurality of grid structures each being assigned to only a single safety level ASIL-A to ASIL-D and having a resolution adapted to the safety level. These grid structures are illustrated in the following figures.

Figure 3:
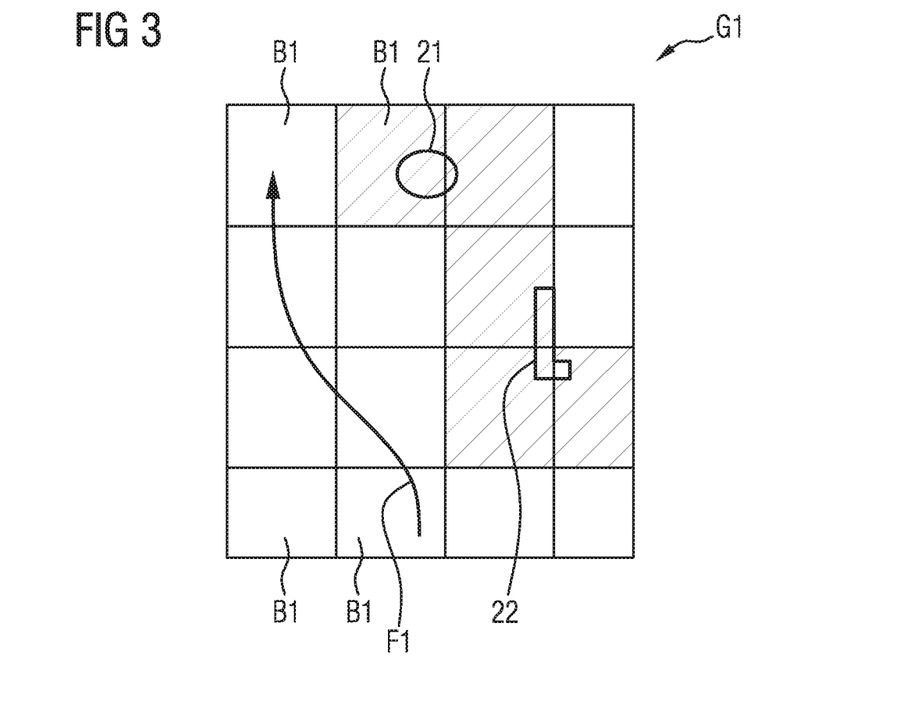
FIG. 3 shows a grid structure for the highest safety level.

FIG. 3 shows a grid structure G1 having very large spatial regions B1. Obstacles 21, 22 are situated at the same positions as shown in FIG. 2. Impassable spatial regions B1 are stored in gray. The grid structure G1 corresponds to the highest safety level ASIL-D, which is why the spatial regions B1 are very large. For the sake of simplicity, only those regions B1 in which at least some of the obstacles 21, 22 are situated are stored in gray as impassable regions here. It is seen that the total impassable area is very large. A route F1, which is possible with the present constellation of the obstacles 21, 22, is indicated by an arrow. It is seen that there is a very great deviation from the original course of the vehicle 1 here.

Figure 4:
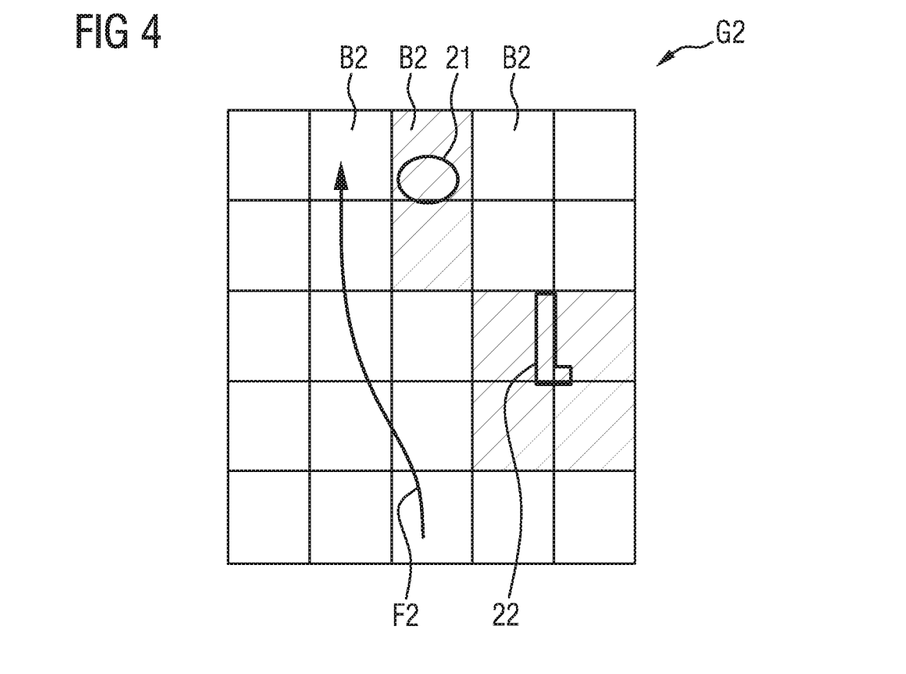
FIG. 4 shows a grid structure for a high safety level.

FIG. 4 shows a grid structure G2 having large spatial regions B2. It corresponds to a high safety level ASIL-C. In this case too, obstacles 21, 22 are situated at the same positions as in the preceding figures. The spatial regions B2, are smaller than the spatial regions B1 in the grid structure G1, as a result of which the impassable regions B2, which are marked in gray, occupy an overall smaller area than shown in FIG. 3. A route F2, which is possible with the present constellation of the obstacles 21, 22, is indicated by an arrow. It is seen that there is already a less significant deviation from the original course of the vehicle 1 here than shown in the preceding figure.

Figure 5:
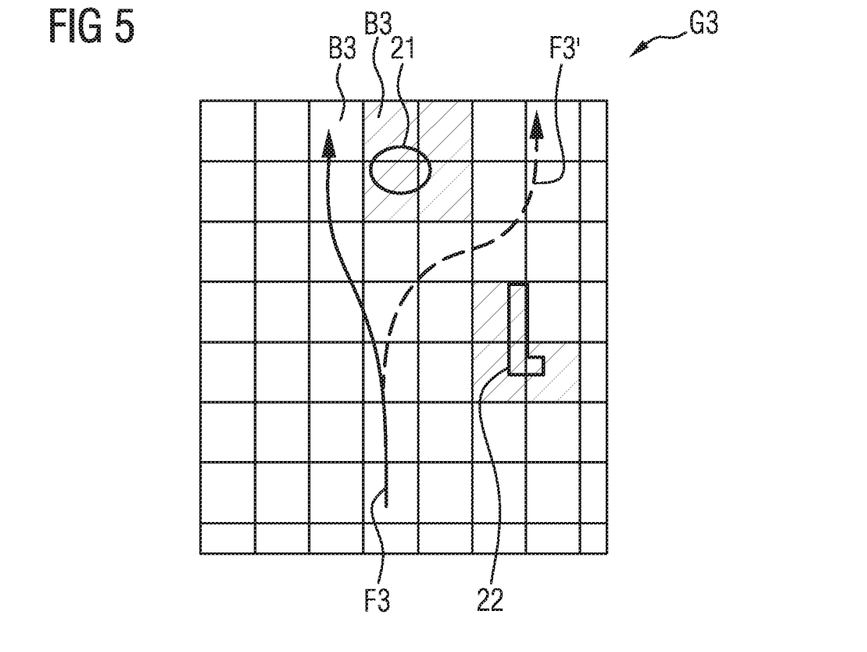
FIG. 5 shows a grid structure for a normal safety level.

FIG. 5 shows a grid structure G3 having spatial regions B3 of a normal size and obstacles 21, 22 as shown previously. The grid structure G3 corresponds to a medium safety level ASIL-B, which is why the spatial regions B3 are smaller than the spatial regions B1, B2 in the preceding figures. The total impassable area is again highlighted in gray and is smaller than in the preceding figures. It is not contiguous here and therefore makes it possible to drive between the obstacles 21, 22 without crossing an impassable region. This is possible with the medium safety level ASIL-B, for example at a low vehicle speed.

A route F3 which is possible with the present constellation of the obstacles 21, 22 is indicated by an arrow. It is seen that there is an even less significant deviation from the original course of the vehicle 1 here than shown in the preceding figures. A possible route F3' which passes through between the obstacles 21, 22 is illustrated using dashed lines, but requires large steering lock angles and is therefore not the preferably selected route.

Figure 6:
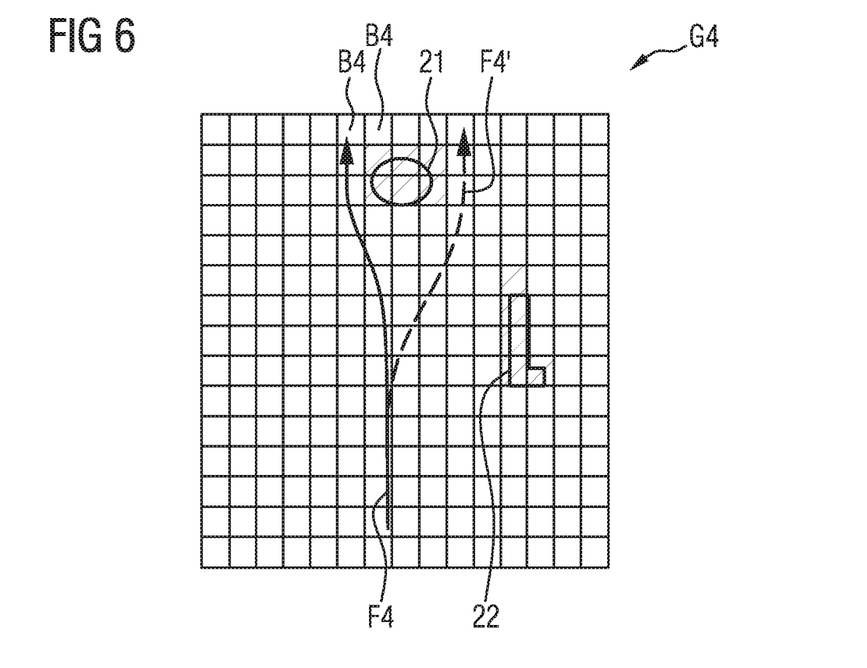
FIG. 6 shows a grid structure for a low safety level.

FIG. 6 shows a grid structure G4 having small spatial regions B4 and obstacles 21, as shown in the preceding figures. The grid structure G4 corresponds to the lowest safety level ASIL-A and the entire impassable area marked in gray is again smaller than shown in FIG. 5. In this case, it is possible to drive through between the obstacles 21, 22 without having to carry out relatively large steering movements.

A route F4, which is possible with the present constellation of the obstacles 21, 22, is indicated by an arrow. It is scarcely shorter than the route F3 shown in FIG. 5. A possible route F4' that passes through between the obstacles 21, 22 is illustrated using dashed lines. It requires scarcely larger steering lock angles than the route F4 and is therefore an alternative to the latter which definitely comes into consideration.

Figure 7:
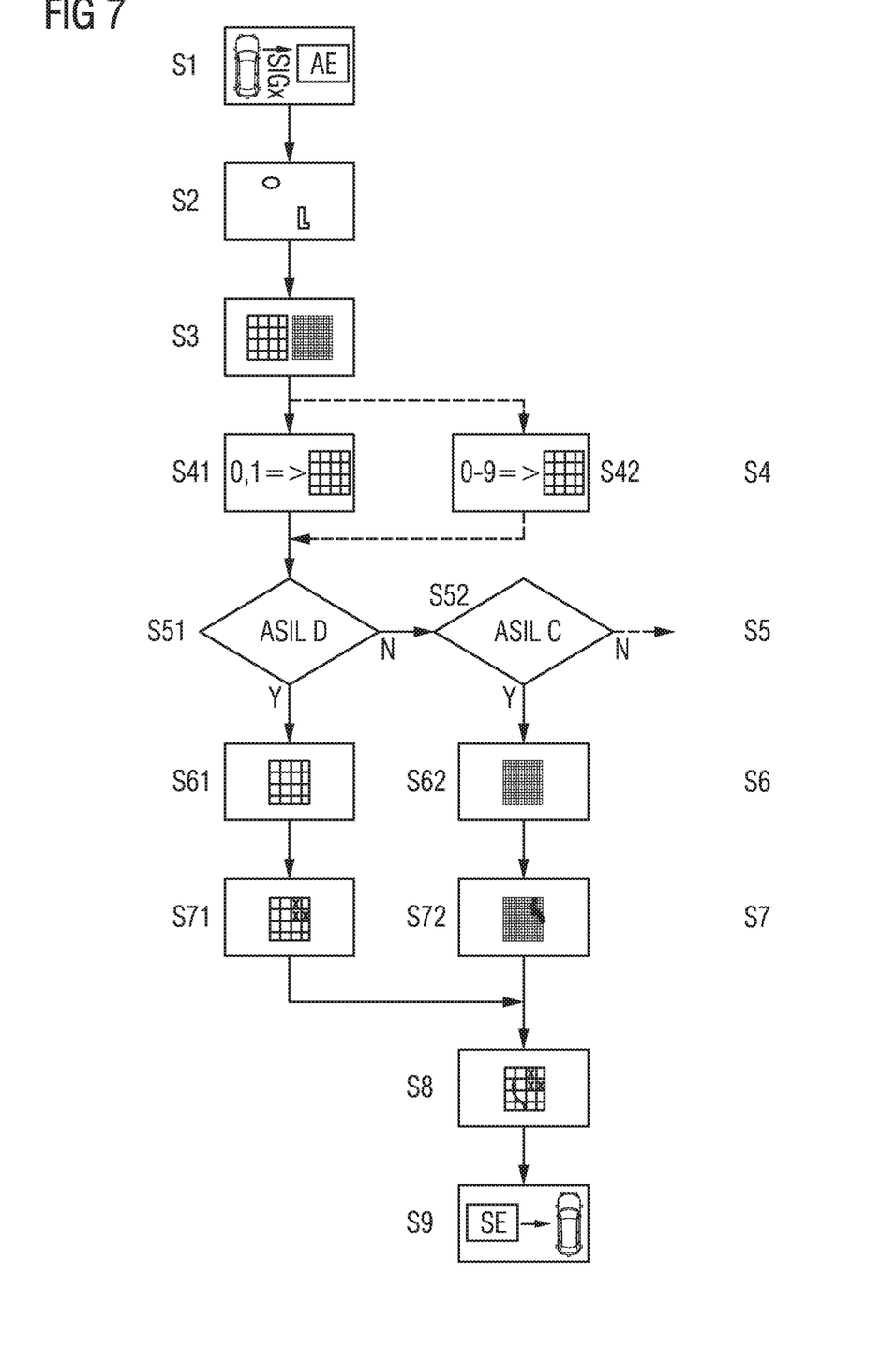
FIG. 7 shows a flowchart of a method according to the invention.

FIG. 7 shows a flowchart of a method according to the invention, in step S1, sensor signals SIG1-SIG7 are captured by the evaluation unit AE. In step S2, the captured sensor signals are evaluated. In this case, the spatial position of obstacles 2, 21, 22 which are captured by the sensor signals SIG1-SIG7 is evaluated. The type of obstacles 2, 21, 22 is also determined from the sensor signals SIG1-SIG7. Depending on the type of obstacle 2, 21, 22, it may have different effects on the passability of the area surrounding the obstacle 2, 21, 22. If the obstacle 2, 21, 22 is a solid object, for example another vehicle, a tree or a building, the area surrounding this obstacle 2, 21, 22 is impassable by the vehicle 1. If the obstacle is, for example, falling leaves, the area surrounding this obstacle may be definitely passable. A road marking can also be detected as an obstacle on the ground which nevertheless does not impair the passability of its surrounding area. In contrast, an icy surface on the road can definitely be classified as an obstacle which impairs the passability of its surrounding area. The speed and direction of movement of an obstacle are also advantageously determined during this evaluation and contribute to marking as impassable regions in which the moving obstacle is currently situated or into which it will shortly presumably move.

There are the wide variety of sensors and methods for evaluating their signals that make it possible to determine both the spatial position of an obstacle 2, 21, 22 and its type in a more or less accurate manner. These are not described here in any more detail since they are known to a person skilled in the art and their exact method of operation does not have a direct influence on the invention. The important factor is that a corresponding evaluation is carried out.

In step S3, at least two grid structures G1-G4, which are assigned to different safety levels ASIL-A to ASIL-D, are provided. Each of the grid structures G1-G4 has spatial regions B1-B4 that have a substantially constant size. In this ease, the size of the regions B1-B4 is dependent on the safety level ASIL-B to ASIL-A of the respective grid structure G1-G4.

In step S4, the obstacles 2, 21, 22 determined by evaluating the sensor signals SIG1-SIG7 are entered in the spatial regions B1 B4 of the at least two grid structures G1-G4 according to their position and type. In this respect, two alternative possibilities are indicated in the figure. In step S41, a value "1" is entered in the corresponding region B1-B4 if an obstacle 2, 21, 22 is present, whereas a value "0" is entered in a region B1-B4 if an obstacle is not present in this region. Alternatively, in step S42, the type of obstacle and its influence on the passability of the respective region are entered with a respective value in the region B1-B4. Any desired values between "0" and "9" are indicated here, but any other suitable division can also be used.

In step S5, a matching safety level ASIL-A to ASIL-D is selected on the basis of the current state of the vehicle 1. If the selected safety level is the highest safety level ASIL-D, the process branches to step S61 in step S51. If it is the high safety level ASIL-C, the process branches to step S62 in step S52. Only a distinction between the high safety level ASIL-C and the highest safety level ASIL-D is illustrated here. A request for further safety levels is not illustrated here for the sake of simplicity, but rather is only indicated by the dashed arrow at the negation output "N" of step S52. If only these two safety levels are actually used, the process continues with step S62 even if a lower safety level ASIL-A, ASIL-B is present.

In step S6, the grid structure G4-G1 belonging to the selected safety level ASIL-A to ASIL-D is selected. This is indicated in steps S61, S62. In step S7, all spatial regions B1-B4 that are impassable are marked. For this purpose, a check is earned out in order to determine whether the entry in the respective spatial region B1-B4 exceeds a minimum value. If this is the case, the corresponding region B1-B4 is marked as impassable. This is indicated in the figure for steps S71, S72.

A development of the method according to the invention provides for a route F1-F4, which avoids impassable regions B1-B4, to be determined in a step S8. In step S9, the vehicle 1 is controlled in a manner bypassing the detected obstacles 21, 22 according to the determined route F1-F4.

Figure 8:
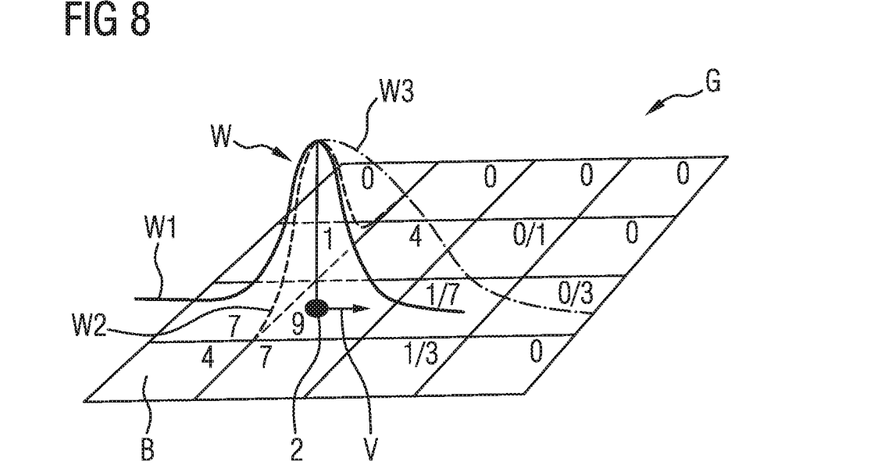
FIG. 8 shows a grid structure having a two-dimensional weighting function.

FIG. 8 shows a grid structure G having a two-dimensional weighting function W. The weighting function W has a maximum value at the location of the obstacle 2. This value falls according to a Gaussian function with increasing distance from the obstacle 2. This is indicated by the line W1 and the dashed sine W2 which correspond to the main directions of the grid structure. A graduated weighting function or another suitable weighting function can also be usefully used here. If the obstacle 2 is moving at a speed v indicated by an arrow in the direction of movement indicated by the arrow, the weighting function W is usefully increased in the direction of movement of the obstacle 2. This is indicated by the dot-dashed line W3, which in this case replaces the line W1 in the illustrated region.

Values between "0" and "9", which are entered in the regions B and indicate the obstacles 2, 21, 22 situated in the respective region B and their weighting, are seen. Only one obstacle 2 is illustrated here. It results in the value "9" being entered in the region B in which it is situated. The value "7" is entered in the adjacent regions closest to the obstacle 2, and lower values are entered in regions that are further away. Regions in which two values are entered can be seen in the right-hand region of the grid structure G. In this case, the first value relates to an obstacle 2 that is not moving, and the second value relates to an obstacle 2 that is moving at speed v in the direction of movement. It is seen that the values entered in this case are higher in accordance with the weighting function W increased there in this case according to the line W3. If the minimum value used in step S7 is now "5", all regions B which have a value greater than "5" are marked as impassable regions. In the example illustrated, the region to the right of the obstacle 2 is also marked as impassable if the obstacle 2 is moving at speed v. It should be noted that the weighting functions indicated here and the entered values are only exemplary and do not necessarily correctly match one another mathematically.

The invention is used, for example, in highly automated vehicles L Highly automated vehicles 1 are en route in a multiplicity of different situations. These situations are not necessarily assigned to the same safety level ASIL-A to ASIL-D. For example, an overtaking maneuver may require a different classification to the following of the vehicle's own traffic lane. These safety levels ASIL-A to ASIL-D are often directly associated with safety distances to be complied with. Whereas the vehicle 1 can drive very close to obstacles 2, 21, 22 in the slow speed range, for example, this is not desirable on highways.

The depletion of the free region around the vehicle 1, that is to say the region which is safely passable by the vehicle, is represented by grid data structures. A grid data structure is defined by the combination of cells of identical dimensions, the regions B1-B4, which have an area of 10 cm×10 cm for example, a number and the arrangement of cells, the regions B1-B4. As described above, however, different safety distances need to be selected for different safety levels ASIL-A to ASIL-D. These can also be correlated with the speed. In order to solve this problem, a plurality of identical grid structures G1-G4 can be used, but these accordingly increase the memory and computing requirement. If, for example, all four safety levels ASIL-A to ASIL-D are used, the system requires four grid structures G1-G4 which are all filled with the same data. This is not useful. In order to solve the problem, it is proposed not to keep the redundant grid structures G1-G4 in the same resolution. The safety region is still, for example, a cell, that is to say a region B1-B4, around an obstacle, which allows a constant computing time. The resolution of the grid structure G1-G4 is again dependent on the safety level ASIL-A to ASIL-D. The resolution is particularly small for the lowest safety level ASIL-A, and is accordingly larger for the highest safety level ASIL-D. The resolution of the grid structure G1-G4 is possibly also dependent on the vehicle's own current speed or the current differential speed.

One advantage of the invention lies in its simplicity. Whereas the sensor models are adapted to enter the sensor information and are dependent on the safety level and the speed in the conventional variant, the same algorithms and processing chains can be used for all safety levels. In addition, the memory requirement no longer increases in a linear manner and the computing power no longer increases quadratically with the number of safety levels. The memory and computing requirement therefore falls.

The processing of the grid structures G1-G4 by a downstream application is also simplified as a result of the small number of regions B1-B4, that is to say by the lower resolution.

As can be seen in the figures, only one region around the obstacle is occupied by a value for the passability. Digital storage is illustrated in these figures. Floating-point values are usually used in a real implementation. This then also makes it possible to divide an obstacle, which is not in the center of a region B2-B4 in the rough grid structures G2-G4, among the surrounding regions B2-B4. The distribution according to a Gaussian curve is useful here, for example.

It is within the ability of a person skilled in the art to modify one or more of the measures mentioned or to use them in another combination without going beyond the concept of be invention even if these are not explicitly described here.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choke. It is the intention, therefore, to be limited only as indicated by the scope of the claims appended hereto.

What is claimed is:

1. A method for determining, dependent on safety levels (ASIL-A—ASIL-D), spatial regions (B, B1-B4) impassable by a vehicle (1), the method comprising:
    capturing (S1) sensor signals (SIG1-SIG7);
    evaluating (S2) the captured sensor signals (SIG1-SIG7) with respect to: (a) the spatial position of an obstacle (2, 21, 22) to which the sensor signals (SIG1-SIG7) relate, and (b) the effect of the obstacle (2, 21, 22) on the passability of the area surrounding the obstacle (2, 21, 22);
    providing (S3) at least two grid structures (G, G1-G4) assigned to different safety levels (ASIL-A—ASIL-D), wherein each of the grid structures (G, G1-G4) has spatial regions (B, B1-B4) of substantially constant size, and the size of the spatial regions (B, B1-B4) is dependent on the safety level (ASIL-A—ASIL-D) of the respective grid structure (G, G1 G4);
    entering (S4) the obstacles (2, 21, 22) in the spatial regions (B, B1-B4) of the at least two grid structures (G, G1 G4);
    selecting (S5) a safety level (ASIL-A—ASIL-D) matching the current state of the vehicle (1);
    selecting (S6) the grid structure (G, G1-G4) belonging to the selected safety level (ASIL-A—ASIL-D); and
    marking (S7) all spatial regions (B, B1-B4) of the selected grid structure (G, G1-G4) having an entry that exceeds a minimum value as regions (B, B1-B4) that are impassable by the vehicle (1),
    wherein the evaluated sensor signals (SIG1-SIG7) are entered in the spatial regions (B, B1-B4) by a two-dimensional Gaussian weighting function (W), the weighting function having a maximum value at the location of the obstacle, and a value which falls with increasing distance from the obstacle.

2. The method as claimed in claim 1, wherein the weighting (W) is carried out at least in part on the basis of the speed (v) of the obstacle (2, 21, 22).

3. The method as claimed in claim 1, further comprising:
    determining (S8) a route (F1, F2, F3, F3', F4, F4') that avoids the marked impassable regions (B, B1-B4); and
    controlling (S9) the vehicle (1) according to the determined route (F1, F2, F3, F3', F4, F4').

4. A non-transitory computer-readable storage medium storing a computer program directly loadable into internal memory of a digital computer, the program comprising software code sections configured to, when the computer program product runs on the digital computer, carry out a method for determining, dependent on safety levels (ASIL-A—ASIL-D), spatial regions (B, B1-B4) impassable by a vehicle (1), the method comprising:
    capturing (S1) sensor signals (SIG1-SIG7);
    evaluating (S2) the captured sensor signals (SIG1-SIG7) with respect to: (a) the spatial position of an obstacle (2, 21, 22) to which the sensor signals (SIG1-SIG7) relate, and (b) the effect of the obstacle (2, 21, 22) on the passability of the area surrounding the obstacle (2, 21, 22);
    providing (S3) at least two grid structures (G, G1-G4) assigned to different safety levels (ASIL-A—ASIL-D), wherein each of the grid structures (G, G1-G4) has spatial regions (B, B1-B4) of substantially constant size, and the size of the spatial regions (B, B1-B4) is dependent on the safety level (ASIL-A—ASIL-D) of the respective grid structure (G, G1 G4);

entering (S4) the obstacles (2, 21, 22) in the spatial regions (B, B1-B4) of the at least two grid structures (G, G1 G4);

selecting (S5) a safety level (ASIL-A-ASIL-D) matching the current state of the vehicle (1);

selecting (S6) the grid structure (G, G1-G4) belonging to the selected safety level (ASIL-A—ASIL-D); and marking (S7) all spatial regions (B, B1-B4) of the selected grid structure (G, G1-G4) having an entry that exceeds a minimum value as regions (B, B1-B4) that are impassable by the vehicle (1), wherein the evaluated sensor signals (SIG1-SIG7) are entered in the spatial regions (B, B1-B4) by a two-dimensional Gaussian weighting function (W), the weighting function having a maximum value at the location of the obstacle, and a value which falls with increasing distance from the obstacle.

5. An apparatus for determining spatial regions (B, B1-B4) that are impassable by a vehicle (1) in a manner dependent on safety levels (ASIL-A—ASIL-D), comprising:

a sensor (101-107) configured to detect obstacles (2, 21, 22) in the environment of the vehicle (1);

an evaluation unit (AE) configured to evaluate the detected obstacles (2, 21, 22) according to a method for determining, dependent on safety levels (ASIL-A—ASIL-D), spatial regions (B, B1-B4) impassable by a vehicle (1), the method comprising:

capturing (S1) sensor signals (SIG1-SIG7);

evaluating (S2) the captured sensor signals (SIG1-SIG7) with respect to: (a) the spatial position of an obstacle (2, 21, 22) to which the sensor signals (SIG1-SIG7) relate, and (b) the effect of the obstacle (2, 21, 22) on the passability of the area surrounding the obstacle (2, 21, 22);

providing (S3) at least two grid structures (G, G1-G4) assigned to different safety levels (ASIL-A—ASIL-D), wherein each of the grid structures (G, G1-G4) has spatial regions (B, B1-B4) of substantially constant size, and the size of the spatial regions (B, B1-B4) is dependent on the safety level (ASIL-A—ASIL-D) of the respective grid structure (G, G1 G4);

entering (S4) the obstacles (2, 21, 22) in the spatial regions (B, B1-B4) of the at least two grid structures (G, G1 G4);

selecting (S5) a safety level (ASIL-A—ASIL-D) matching the current state of the vehicle (1);

selecting (S6) the grid structure (G, G1-G4) belonging to the selected safety level (ASIL-A—ASIL-D); and marking (S7) all spatial regions (B, B1-B4) of the selected grid structure (G, G1-G4) having an entry that exceeds a minimum value as regions (B, B1-B4) that are impassable by the vehicle (1), wherein the evaluated sensor signals (SIG1-SIG7) are entered in the spatial regions (B, B1-B4) by a two-dimensional Gaussian weighting function (W), the weighting function having a maximum value at the location of the obstacle, and a value which falls with increasing distance from the obstacle; and a controller (SE) configured to control the vehicle (1) along a route (F1, F2, F3, F3', F4, F4') while avoiding the impassable regions (B, B1-B4).

* * * * *